United States Patent
Rolleston et al.

(10) Patent No.: US 8,984,402 B2
(45) Date of Patent: Mar. 17, 2015

(54) VISUAL INDICATION OF DOCUMENT SIZE IN A VIRTUAL RENDERING

(75) Inventors: Robert John Rolleston, Rochester, NY (US); Alan Thomas Cote, East Rochester, NY (US); Neil R. Sembower, Austin, TX (US); Jeffrey David Kingsley, Macedon, NY (US)

(73) Assignee: Xerox Corporation, Norwalk, CT (US)

( * ) Notice: Subject to any disclaimer, the term of this patent is extended or adjusted under 35 U.S.C. 154(b) by 539 days.

(21) Appl. No.: 12/972,753

(22) Filed: Dec. 20, 2010

(65) Prior Publication Data

US 2012/0159321 A1    Jun. 21, 2012

(51) Int. Cl.
  *G06F 17/00* (2006.01)
  *G06T 15/00* (2011.01)

(52) U.S. Cl.
  CPC .................................. *G06T 15/005* (2013.01)
  USPC ............ 715/274; 715/757; 715/782; 715/850

(58) Field of Classification Search
  CPC ............................ G06F 17/212; G06F 3/04815
  USPC ................. 715/204, 866, 274, 757, 782, 850; 345/660, 664
  See application file for complete search history.

(56) References Cited

U.S. PATENT DOCUMENTS

| 7,062,722 | B1 * | 6/2006 | Carlin et al. ................... 715/850 |
| 8,107,141 | B2 * | 1/2012 | Patrick et al. ................. 358/527 |
| 8,120,814 | B2 * | 2/2012 | Horiuchi ........................ 358/1.9 |
| 2003/0140315 | A1 * | 7/2003 | Blumberg et al. ............ 715/527 |
| 2005/0174349 | A1 * | 8/2005 | Watson .......................... 345/427 |
| 2005/0275879 | A1 * | 12/2005 | Ogasawara ................... 358/1.15 |
| 2006/0114490 | A1 | 6/2006 | Rolleston |
| 2006/0136813 | A1 | 6/2006 | Hong et al. |
| 2007/0240042 | A1 * | 10/2007 | Sato ............................... 715/527 |
| 2011/0007373 | A1 * | 1/2011 | Horiuchi ........................ 358/527 |

OTHER PUBLICATIONS

Donna Baker, Acrobat 9 to the rescue editing PDF files, Aug. 2009.*
Using People to Give Rendering a Sense of Scale, AutoCAD Forums, Sep. 13, 2004, pp. 1-3 Retrieved: http://www.cadtutor.net/forum/archive/index.php/t-1748.html.*

* cited by examiner

*Primary Examiner* — Cesar Paula
*Assistant Examiner* — Howard Cortes
(74) *Attorney, Agent, or Firm* — Fay Sharpe LLP (57) ABSTRACT

Methods and a system for an electronic device to allow for indicating a size or scale of a rendering in a three dimensional view. A virtual scene is displayed on a display with a work product that is rendered, such as a document or packaging request having a job ticket. The rendering is provided with a common object that is a three dimensional virtual object that relates size to the document or packaging for approval in the proofing process. A quick visual cue is therefore provided to visually convey a realistic scale in proportion to the product rendered three dimensionally.

16 Claims, 7 Drawing Sheets

VISUAL INDICATION OF DOCUMENT SIZE IN A VIRTUAL RENDERING

BACKGROUND

The exemplary embodiment relates to fields of image processing. It finds particular application in connection with the provision of a user interface for indicating size in a virtual rendering, and is described with particular reference thereto. More particularly, a system and method is disclosed for a document production visualization with application to animated viewing of three dimensional images at any number of the stages of production of the document for use in proofing.

The size of a document is distinguished in order to effectively present information to an audience. A poster sized document, for example, more effectively presents ideas to an audience. Various sized documents are used for various purposes that may range from giving thanks in a postcard to showing off a city's sports icon in a poster spanning the side of a skyscraper. For example, a political campaign may target an audience of drivers passing a yard poster. Regardless of the audience and the intended purpose document sizes vary as well as the needs for presentation. This applies not only to posters or other type documents, but also to all types of materials for presenting, transporting and/or securing that have various dimensions needed for specific needs. These needs are often provided by services within economies that have global spans and diverse demographics, which desire efficient means for receiving workflow requests and targeting specific markets.

In one example, print industries have moved towards technical standards, such as Job Definition Format (JDF) to facilitate cross-vendor workflow implementations. JDF, for example, is an XML format about job tickets, message descriptions, and message interchanges. The initial focus was on sheet-fed offsets and digital print workflow, but has been expanded to web roll-fed systems, newspaper workflows, packaging and label workflows. JDF is an extensible format. It defines both JDF files and a job messaging format based on XML over HTTP. In practice, JDF-enabled products can communicate with each other either by exchanging JDF files, typically via "hot folders," or the net or by exchanging messages over the net.

As is typical of workflow systems, the JDF message contains information that enables each "node" to determine what files it needs as input and where they are found, and what processes it should perform. It then modifies the JDF job ticket to describe what it has done, and examines the JDF ticket to determine where the message and accompanying files should be sent next.

A goal of workflow systems, such as with the JDF format, is to encompass the whole life cycle of a print and cross-media job, including device automation, management data collection and job-floor mechanical production process, including even such things as bindery, assembly of finished products on pallets. To realize such a globalization across media provider industries, more vendors need to adopt standards. As such, the standards themselves need to be easily manageable for acceptance. In finishing, binding, and printing there is a tradition of automation and few large enough dominating companies that can steer the development and acceptance of such systems.

One area of development is the binding and assembly of finished products in a three dimensional virtual environment. A workflow is produced, presented to a client generating the workflow request, and sent for production. A need is present therefore to facilitate the workflow request efficiently and effectively in a manner that is intuitive.

INCORPORATION BY REFERENCE

The following references, the disclosures of which are incorporated in their entireties by reference, are mentioned:

U.S. Pub. No. 2006/0114490, published Jun. 1, 2006, entitled SYSTEM AND METHOD FOR DOCUMENT PRODUCTION VISUALIZATION, by Robert J. Rolleston, discloses a system and techniques for a pre-print visualization of a job to be printed.

U.S. Pub. No. 2006/0136813 A1, published Jun. 22, 2006, entitled SYSTEMS AND METHODS FOR ANNOTATING PAGES OF A 3D ELECTRONIC DOCUMENT, by Lichan Hong, Stuart K. Card, Ed H. Chi, discloses a three-dimensional electronic document that is a specified page area to be annotated by making a stroke.

BRIEF DESCRIPTION

The following presents a simplified summary in order to provide a basic understanding of one or more aspects of the disclosure. This summary is not an extensive overview and is neither intended to identify key or critical elements, nor to delineate the scope thereof. Rather, the primary purpose of the summary is to present some concepts of the disclosure in a simplified form as a prelude to the more detailed description that is presented later.

Methods and systems are disclosed that enable a system to provide an indication of the scale or size of a three dimensional rendering by a quick visual inspection. In one embodiment, a system is disclosed to generate a finished work product from a virtual three dimensional rendering in response to a job request. The system comprises a memory coupled to a processor of a computer device to render documents, packages or binding materials in a display. The processor is configured to display a perspective view of a virtual scene with the virtual three dimensional rendering located proximate to a virtual three dimensional object, for example. A common object generator provides a virtual three dimensional object proximate to the rendering to visually convey physical dimensions of the rendering. A work order generator that processes approval of the job request and generates requests for the finished work product in the physical dimensional size of the rendering that is delineated visually by the object.

In another embodiment, a method for indicating size of a virtual document in a document preview system is executed via a processor of a computer with a memory storing executable instructions. A three dimensional document is rendered in a three dimensional scene via the processor of the computer. This processing includes calculating a size of the three dimensional document to be rendered relative to its position in the three dimensional scene. Further, a common object is generated that is proximate to the document corresponding to a set of properties that indicates dimensional proportions of the document based on physically known proportions and visual inspection cues. A workflow request is finalized and the finalized document is presented to a user to obtain a final approval input.

The following description and annexed drawings set forth in detail certain illustrative aspects and implementations of the invention. These are indicative of only a few of the various ways in which the principles of the invention may be employed.

DETAILED DESCRIPTION

One or more implementations of the present disclosure will now be described with reference to the attached drawings, wherein like reference numerals are used to refer to like elements throughout. Aspects of the exemplary embodiment relate to a system and methods for providing the ability to visually inspect or proof a work product in a virtual three dimensional environment and generate a request for the product to be manufactured in a physical environment. A trend towards job definition format (JDF) has been to encapsulate a production shop and allow for easy outsourcing by clientele. With the virtual rendering of a finished document, package or other like work order, a job ticket conveys multiple specifications and needs toward the final product. When an order of multiple copies or bulk volumes is required, a mistake in processing orders can be costly. Therefore, an easy and quick way to prevent mistakes, such as with document size and packaging dimensions is needed. In particular, three dimensional virtual environments have additional complexities, and thus, these environments would benefit from fast and easy indicators or visual cues that provide confirmation of dimensions and aid in preventing costly mistakes.

For example, a size indicator that provides a visual scaling of the complete work product, such as a document or package rendered in a virtual three dimensional platform, helps to ensure efficiency and quality of finished products. In cases involving bounded documents, for example, an additional context is generated in the binding object. The binding has to fit the object it is binding and sufficient to the satisfaction of the user. Common objects that are virtual three dimensional objects provide relative scale in a three dimensional virtual work flow environment.

As used in this disclosure, "proofing" is the process of producing a printed output on a device, such as a proofer device, for example, that emulates the printed output on a press/printer (the final production device that can be a conventional press, a digital press, or the like) where the final printed product will be produced. Soft proofing is implemented where the proofer or device for proofing is a screen or user interface screen. Pre-press proofing (or off-press proofing) provides a visual copy without creating a press proof. Approval or confirmation of the proof is the process of approving or rejecting the proofing (or soft-proofing). The original input files have to be processed to be printed on the final press (interpreting, rendering, screening, color management, and the like) and the same to be printed on the proofer (different characteristics). The decision on which of the processing steps will be executed once (common both for printing on the proofer and on the press) and which will not be executed depends on many parameters (e.g., characteristics of the proofer device, user requirements, workflow requirements).

Figure 1:
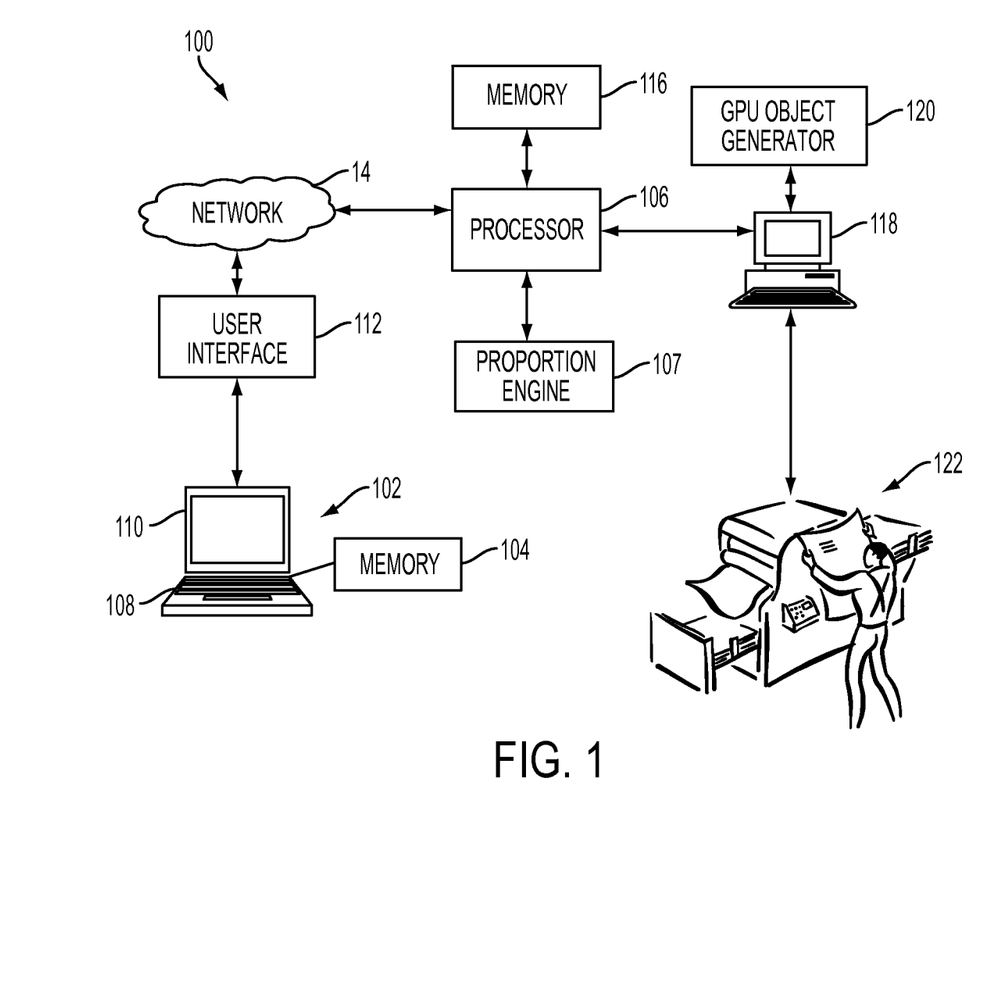
FIG. 1 is a functional block diagram of a user interface and control system according to embodiments herein.

FIG. 1 illustrates one embodiment of an exemplary user interface and control system 100 for creating a work flow for a print job in a three dimensional virtual rendering of a document or packaging to be proofed and further processed after approval of the proofing. A client device, such as a computer device 102 comprises a memory 104 for storing instructions that are executed via a processor therein. The system 100 may include an input device 108, a display 110, a user interface 112, and/or a network connection 114.

Content that may be displayed or rendered in the user interface 112 is sent over the network 114. The network 114 may be in the form of an internet connection, some other connection or may be any device for storing and transferring data for supplying content in digital format. The data could be a job request by a client or customer with the content and specifications for the job that may be converted to JDF or some other format language (e.g., XML, or the like), which defines a job ticket for creation of a job request. The request may be for printed documents, packaging items, kitting, or the like to be proofed and sent to production. The present disclosure is applicable to any context in which a virtual three dimensional rendering is presented and is not limited to only packaging and workflow request environments.

A central processor 106 having a memory 116, for example, receives a job request and processes it through one or more workstations 118 for virtual three dimensional rendering thereon. Virtual renderings of the job are presented in three dimensional virtual scenes via a graphics processing unit (GPU) 120, for example, or a visual processing unit that specializes in offloading and accelerating three dimensional and/or two dimensional graphics rendering from a microprocessor to the workstation 118. The GPU 120 operates as a common object generator for generating objects, such as common objects for referencing a dimensional size in three dimensions. In one example, the processor 106 is a networked Document Product Visualization (DPV) processor 106 that operates with software to store JDF data in the memory 116. The processor utilizes a proportion engine 107 to gauge dimensions of the virtual renderings, such as document or packaging requests and determines sizing relative to camera or viewing position in the virtual scene.

The workstation 118 or work order generator that provides a display that renders a virtual rendering of the document, or package for the user, in which the user afterwards provides an approval input, or confirmation that the document or package is the dimensions, color, or other specifications to the user's satisfaction. The job request or ticket is then updated in memory, for example, and sent down the production chain to a production printer for a final work product 122 to be produced and delivered to the client. At each stage of the multi-stage workflow process, a final rendering is available to the user and confirmed by proofing for further processing or production. The use of analytic tools can be used to measure sizes and edit the rendering.

In one embodiment, a common object comprising a virtual three dimensional object is provided within a virtual three dimensional scene in order to visually illustrate or confirm the proportions of the rendering for further processing within a workflow system, such as a document production visualization system. The common object is placed proximate to a document, for example, and provides a relative basis upon which to judge the size of the product for entering the next stage of production.

Figure 2:
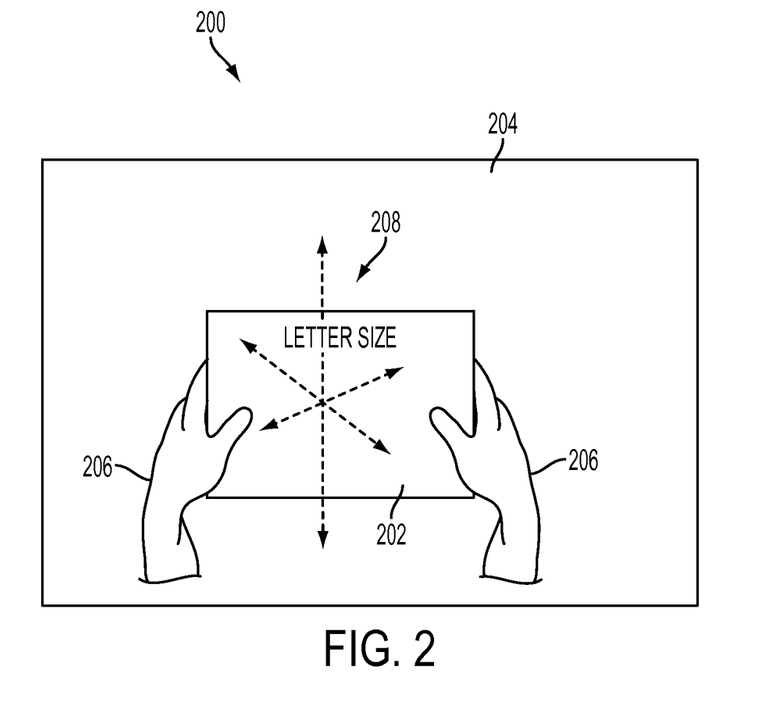
FIG. 2 is a representation of a user interface screen according to embodiments herein.

Referring now to FIG. 2, illustrated is an exemplary embodiment of a rendered document with a common object to illustrate scaling in a three dimensional scene of a user interface. A DPV system has the ability to render multiple objects in a scene. Therefore, an additional object is provided that indicates a scale or size of the document or package rendered in three dimensions.

In one embodiment, a virtual three dimensional interface 200 is generated by a DPV processor 106 (of FIG. 1). A rendered job request or product comprises a rendering 202, for example, of a document and/or a packaging, such as a box that is sized for special delivery. The rendering 202 is a virtual three dimensional representation presented in a three dimensional scene 204. As an option, the document 202 is able to be positioned or rotated along an axis 208 in the three dimensional scene 204 to enable proofing at any angle or position. There are various methods for providing a coordinate system of a three dimensional workspace that is independent of viewpoint and display. For example, light sources, a view and virtual cameras may be positioned in a world coordinate system. For further description and examples of systems with coordinate systems for display in three dimensions see U.S. Pub. No. 2006/0136813 mentioned above and incorporated by reference herein.

Alongside or proximate to the document 202, one or more common objects 206 is presented to a user. The presented common object 206 comprises a pair of hands, although other common objects are envisioned and the disclosure herein is not limited to any one particular common object 206 proximate the document or packaging 202 in a three dimensional virtual scene 204.

In one embodiment, the common object 206 is selected from among a set of objects by the processor 106 or the user in order to aptly reference a physical size or dimension of the rendered document 204. In one embodiment, the common object 206 is chosen according to a set of properties, which can indicate dimensional proportions of the document based on physically known proportions and visual inspection cues. For example, a property used for selection may include a country of origin, in which the rendering is being presented. In this instance, the common object 206 could be a virtual three dimensional object that corresponds to the country of origin, such as a coin or monetary currency that is a size familiar to the user. The coin may be held alongside, adjacent or proximate to the rendering 202 of a document or packaging in order to denote an actual physical size from a quick inspection without having to pull up a job ticket or specification written.

In other examples, a property by which the object 206 is chosen may be a corresponding size related to the packaging or document being rendered in three dimensions. A set of properties can include proportional correlations to sizes of objects within a physical location or use of a final document from the document rendered in order to visually convey a vastness or a smallness of the object in the virtual rendering.

The dimensions of the object 206 and the rendering 202 (e.g., document, or packaging) may also be properties to determine a comparison or contrasting of sizes. A small item may convey the enormity of something more than another object of similar size, for example, a cat next to an elephant, or in document terms, a coin next to a poster sized document. Alternatively, the common object 206 may be large in comparison to the physical dimensions, such as an automobile of a certain familiar model with a postcard near the windshield. This disclosure is not limited to any one particular type of object for indicating size of a work product, such as a document or package presented for approval of proofing. Other objects may be envisioned and selected among by the user or automatically selected. The objects indicating size may be a ruler or measuring stick having measuring marks, a pencil, a pair of hands, a person, an animal, a finger and/or any virtual three dimensional common object to contrast and convey the dimensions of the work product based on either a contrasting size or comparable size in relation to the object.

The physical dimensions of the object may vary, and as such, may be conveyed differently with different objects within the virtual three dimensional rendering. Documents, for example, can vary from Letter size (8.5×11"), Legal (8.5× 14"), Tabloid (11×17"), Statement (5.5×8.5"), Executive (7.25×10.5"), Postcard (4.5×6"), A3 (297×420 mm), A4 (210×297 mm), A5 (148×210 mm), A6 (105×148 mm), Oversized (223×297 mm) and other such sizes. Sizes are visually inspected within FIG. 2 in a comparison by the common object 206 that is a pair of hands. Visual inspection cues or visual cues are sensory cues received by a viewer based on the information provided in the three dimensional virtual rendering as discussed herein. Sensory cues, such as visual cues play a role in how viewers perceive. Visual objects, such as the common object 206 are used so that the view can make a best possible probabilistic inference about the state of the physical dimensions in the document 202 or other similar packaging, folded paper, and/or the like. Visual cues include details in the three dimensional virtual rendering of the document/packaging and the common object that provide an accurate single perception when combined in a viewers brain. The depth, angle, length, and width of perception may change depending on the size of the object, the rendered work product (e.g., document, packaging, or the like), and scene in which each of the objects and product is rendered.

Figure 3:
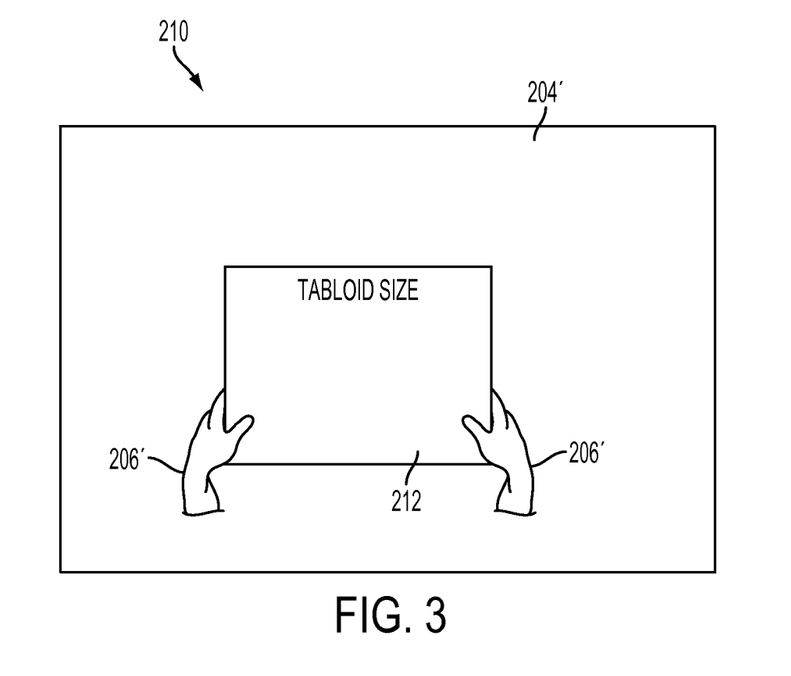
FIG. 3 is a representation of a user interface screen according to embodiments herein.

In the rendering 200 of FIG. 2, for example, the hands 206 indicate a letter size, which is printed on the letter sized document for ease of illustration. In FIG. 3, a rendering 210 is illustrated alongside a document 212 that is tabloid size, which is larger, and therefore, a pair of hands 206' is smaller in comparison to indicate the larger size relative to the physical dimensions of the document 212 when it is a finalized work product at production. In a true virtual scene 204', the hands 206' are a substantially similar size as the hands 206 in FIG. 2, rather the document is what varies, and thus, the same perception is created by making the hands appear smaller with no other reference otherwise. Other examples are also illustrated in renderings 220 and 230 of FIGS. 4 and 5 where the common object is a pencil 226 and 226' rendered as a three dimensional virtual object proximate to a document 222 and 232 respectively. Although the examples illustrate a flat page, a folded page, a stack of pages or packaging may also be used. In addition, the size indicator for scaling may be turned on and off at a user interface control.

Figure 4:
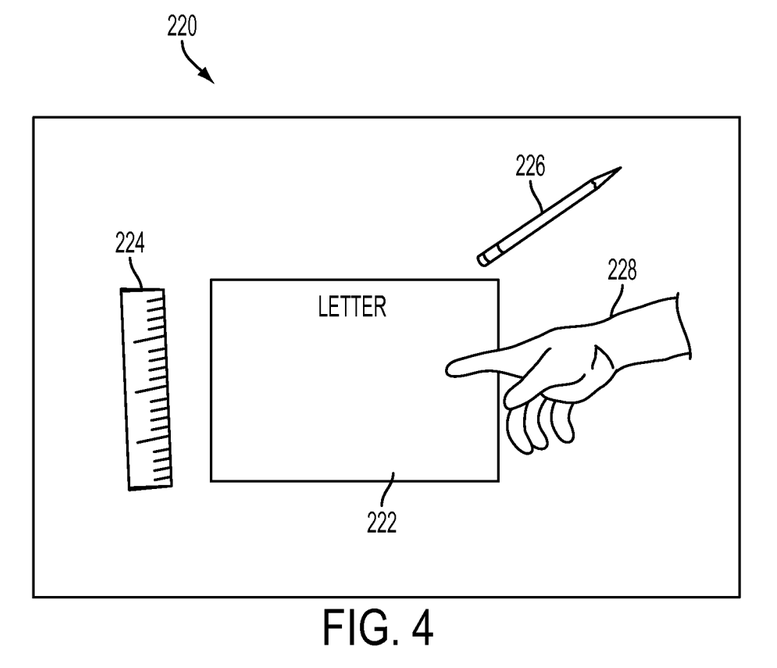
FIG. 4 is a representation of a user interface screen according to embodiments herein.
Figure 5:
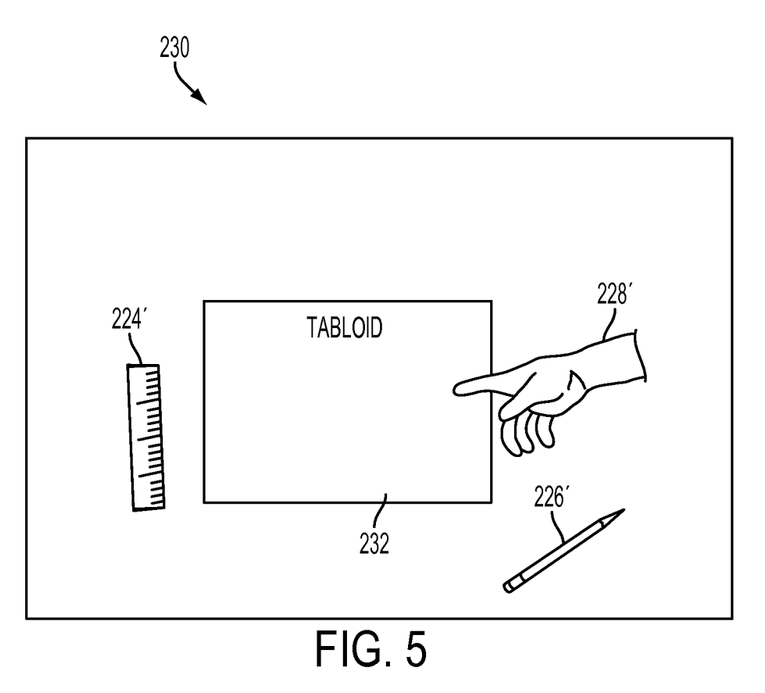
FIG. 5 is a representation of a user interface screen according to embodiments herein.

As shown in FIG. 4 of rendering 220, other objects may also be used such as a ruler or measuring stick 224 or a different hand 228 that is pointing or in some other posture so that multiple objects are used for referencing scale instead of only one. FIG. 5 illustrates the differences in perspective of the multiple objects, such as a ruler 224', a pencil 226', and a pointing hand 228' that are of similar physical dimensions of the common objects in FIG. 4 that are proximate to a differently sized (e.g., tabloid, or the like) document 232.

The methods and systems for DPV are intended to utilize virtual three dimensional renderings that are used through a graphical user interface to provide validation, confirmation and/or approval that the production process satisfies the intended specification. The production operator or person viewing the finalized product may similarly verify the image as well as the person requesting the product, or other viewers within the process chain. Each viewer, user or person may provide a quick quality check for the job. Visual inspection of problem areas is more intuitive than typing a report and/or reviewing a report to ensure satisfaction of specifications. For further description of DPV and uses see U.S. Pub. No. 2006/0114490 mentioned above and incorporated herein by reference.

Figure 6:
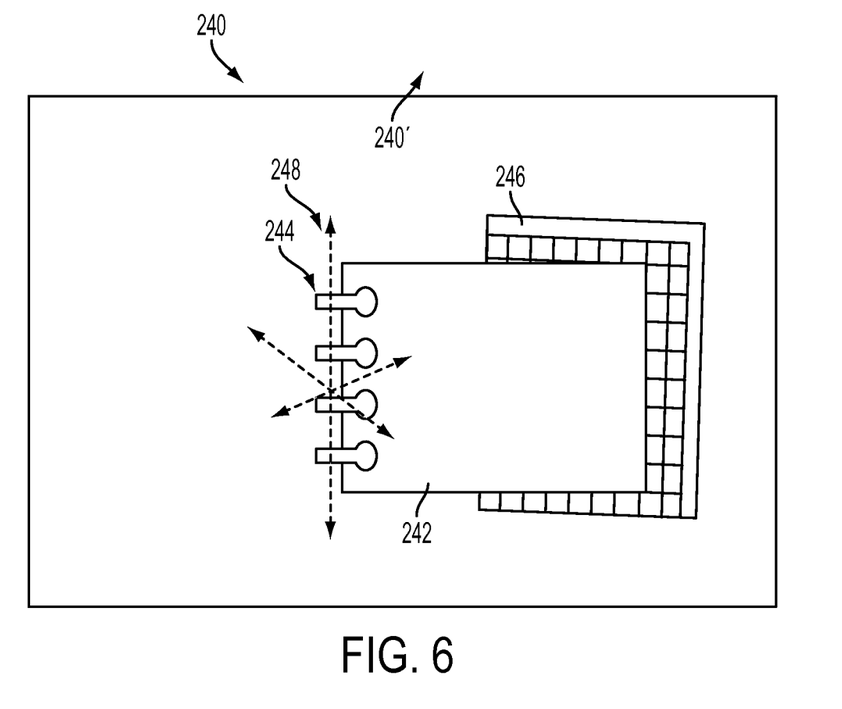
FIG. 6 is a representation of a user interface screen according to embodiments herein.

Referring to FIG. 6, illustrated is a document 242 displayed in a three dimensional scene 240. The document 242 is a three dimensional document illustrated to a user in a display for example within the scene 240. A common object 246 is generated within the scene 240 and placed proximate to the document 242. The object 246 is a three dimensional object, such as a virtual object that includes a grid for scaling the document and providing a visual cue to indicate a size of the document relative to other physical dimensions of various documents.

Although a document is illustrated herein, a packaging product or other rendering for visual inspection may also be utilized for proofing or ordering to get a sense of scale. The object 246 is also used to indicate a pitch of a binding 244. For example, the grid object 246 may be implemented through a GUI control in the three dimensional display for referencing the position of the binding 244 and inspecting proper alignment. The grid object 246 may also be used and rotate three dimensionally along a coordinate axis 248 to ensure proper scale of the document 242 depending on the camera or viewer angle that the three dimensional document 242 is calculated at and presented for proofing.

Figure 7:
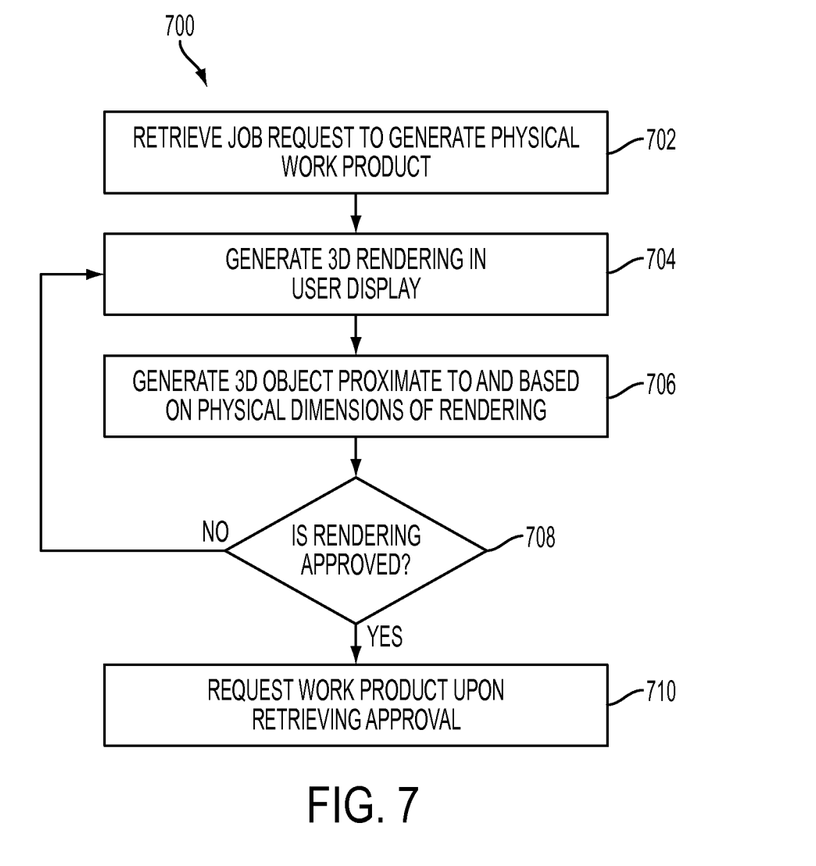
FIG. 7 is a flowchart detailing an exemplary method for displacing objects within a three dimensional virtual scene.

An example methodology 700 for implementing a user interface system for providing scale within a three dimensional workspace is illustrated in FIG. 7. While the method 700 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

The method 700 initiates to retrieve a job request for document pages, document binding, packaging or the like at 702. The job request includes any workflow chain or processing means for processing a rendering in three dimensions to a viewer or proofer. In response to the rendering, the viewer examines the rendering and approves adequate specifications are met to satisfaction, for example. The workflow request is therein finalized in a virtual three dimensional DPV system, for example, and presented to the user to afterwards obtain a final approval input or be edited for later final approval input.

At 704, the rendering is generated in three dimensions. The rendering is a document, packaging, binding, or the like for review that is rendered in three dimensions in order to review all dimensions of the rendering in a user display. In order to render the document, a document preview system calculates a document size relative to a positioning of the virtual three dimensional document. The calculations are generated via a processor of the system according to view of the camera or viewer. The camera can be a virtual camera, and physical dimensions of the object are illustrated in three dimensions according to any one of various algorithms (e.g., a polygon mesh algorithms or the like) for mapping images within a three dimensional coordinate system. For further discussion of mapping in a document preview system see U.S. Pub. No. 2006/0136813 mentioned above and incorporated by reference herein.

At 706, a three dimensional object is generated proximate to or adjacent to the rendering. The object is a common object that a viewer or proofer may be familiar with. The object provides a realistic scale to physical dimensions that the rendering (e.g., document, packaging or the like) is illustrating three dimensionally in a virtual scene of the display. While the rendering may display dimensions differently than what is actually being displayed on the screen, the common object in three dimensions alongside it provides a realistic scale to those physical dimensions. A decision 708 is made regarding whether the rendering is approved in the view. For example, if the inappropriate sizing is obvious from the view of a document in three dimensions alongside a common object (e.g., a pair of hands), the approval is not received and the method 700 flows to 704 to generate a rendering of the document that is acceptable. Once a rendering is approved the method 700 flows to 710 where a work product request is sent upon approval for a physical product with the illustrated dimensions or processed along the workflow chain for further processing of the order.

The methods illustrated in FIG. 7 may be implemented in a computer program product that may be executed on a computer or on a mobile phone in particular. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 7 can be used to implement the method for displaying and manipulating virtual renderings or scenes.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for indicating size of a virtual document in a document preview system executed via a processor of a computer with a memory that stores executable instructions having the method, comprising:
   selecting a document size;
   rendering a three dimensional document in a three dimensional scene via the processor of the computer, the rendered three dimensional document corresponding to the selected document size; and
   generating a common object within the three dimensional scene corresponding to a set of properties that indicates dimensional proportions of the document based on physically known proportions and visual inspection cues of the generated common object;

wherein the set of properties includes a country of origin;
wherein the common object is selected from a set of virtual three dimensional objects corresponding to coins and monetary currency of the country of origin, the set of objects having a size corresponding to the selected document size.

2. The method of claim 1, wherein rendering the three dimensional document comprises:
finalizing a workflow request and presenting the finalized document to a user to obtain a final approval input;
retrieving the final approval input after visual inspection by the user and generating a work order request output.

3. The method of claim 1, comprising: selecting the common object from the set of virtual three dimensional common objects that indicate a visual size based on whether the dimensional proportions of the document correspond to one of a set of document sizes comprising at least a tabloid size, an envelope size, postcard size, letter size, poster, banner, and a legal size, and respective objects of the set vary according to document sizes.

4. The method of claim 1, wherein the document comprises a document page to print or a packaging job to provide packaging upon final approval that respectively has a size conveyed by the common object to contrast or compare based on the dimensions, and the document page or packaging includes a virtual three dimensional rendering of a document or packaging and a virtual three dimensional binding for the document.

5. The method of claim 4, comprising:
retrieving a final approval input after visual inspection by the user and generating a work order request output; and
wherein the three dimensional scene further includes a virtual three dimensional grid object having an analytical grid providing depth of perception and dimensional length and width visual cues to provide measurements and indicate a size of the document based thereon, and the document comprises a three dimensional document for printing, a virtual three dimensional rendering of a binding or a virtual three dimensional packaging.

6. The method of claim 1, comprising:
retrieving a different object request input and generating at least one different common object from the set of objects upon processing the different object request; wherein the set of objects includes various subsets of objects corresponding to each size and other additional sizes, each subset having virtual common objects related to the dimensional proportions, wherein the document includes at least one of a page to print upon receiving a final approval input or a package request.

7. The method of claim 1, wherein the set of properties further include dimensions of the document rendered and physical dimensions of the common objects in the set of virtual three dimensional objects.

8. The method of claim 1, wherein the set of properties include use of a final document from the document rendered in order to visually convey a vastness or a smallness of the common object therein.

9. A system to generate a finished work product from a virtual three dimensional rendering in response to a job request, comprising:
a memory coupled to a processor of a computer device;
a display configured to display a perspective view of a virtual scene with the virtual three dimensional rendering of a selected size and a virtual three dimensional object of a selected size;
a common object generator that generates the virtual three dimensional object within said virtual scene, the virtual three dimensional object corresponding to a set of properties to visually convey physical dimensions of the rendering;
wherein the set of properties includes a country of origin;
the virtual three dimensional object selected a set of virtual three dimensional objects corresponding to coins and monetary currency of the country of origin, the set of objects having a size corresponding to one of a plurality of sizes; and
a work order generator that processes approval of the job request and generates requests for the finished work product in the physical dimensional size of the rendering that is delineated visually by the selected three dimensional object.

10. The system of claim 9, wherein the virtual three dimensional rendering includes a document to print or a packaging to provide upon final approval that respectively has a size conveyed by the three dimensional object to contrast or compare based on the dimensions, and the document or packaging includes a virtual three dimensional binding.

11. The system of claim 10, comprising:
an interface for moving the three dimensional object to any position in the three dimensional virtual scene alongside the rendering; and
a proportional engine that determines a size of the rendered document or package relative to a camera position.

12. The system of claim 11, comprising:
an analytic tool generator that generates a grid tool that measures sizes of the rendered document or package and a binding for the document or package.

13. The system of claim 9, wherein the interface is configured to retrieve a user input that alters the three dimensional object to another three dimensional object within the set or to provide multiple objects that visually indicate the size of the rendered document or packaging.

14. A method for indicating size of a virtual three dimensional rendering in a virtual preview system to generate a finished work product therefrom, executed via a processor of a computer with a memory that stores executable instructions having the method, comprising:
generating the virtual three dimensional rendering of a physical work product in a three dimensional virtual view that is able to be positioned around a three dimensional axis in a user display, the virtual three dimensional rendering of a physical work product including a document of a selected size;
generating a common three dimensional virtual object within the three dimensional view, the generated common three dimensional virtual object indicating dimensional proportions of the virtual three dimensional rendering of a physical work product based on physically known proportions and visual inspection cues of the generated common object, the virtual three dimensional rendering of a physical work product based on physical dimensions that correspond to the finished work product that is to be produced from the virtual three dimensional view;
the common three dimensional virtual object corresponding to a set of properties including a country of origin;
wherein the common three dimensional virtual object is selected from a set of virtual three dimensional objects corresponding to coins and monetary currency of the country of origin; and
generating the finished work product in the physical dimensional size of the rendering corresponding to the selected common three dimensional virtual object.

15. The method of claim 14, comprising:
retrieving a job request to generate the finished work product; and
upon retrieving an approval of the rendering based on a confirmed sizing in the three dimensional view, sending a request for generating the finished work product.

16. The method of claim 14, wherein the common three dimensional virtual object visually indicates size of the virtual three dimensional rendering by contrasting a smaller size of the common three dimensional virtual object with a larger size of the virtual three dimensional rendering, a larger size of the common three dimensional virtual object with a smaller size of the virtual three dimensional rendering, or a size of equal comparison among the common three dimensional virtual object and the virtual three dimensional rendering.

* * * * *